Patented May 9, 1933

1,908,482

UNITED STATES PATENT OFFICE

HANS KLEIN AND ARTHUR BECK, OF MANNHEIM, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

PRODUCTION OF VULCANIZED RUBBER

No Drawing. Application filed June 29, 1929, Serial No. 374,937, and in Germany July 16, 1928.

The present invention relates to the production of vulcanized rubber.

We have found that very valuable vulcanized rubber is obtained by adding to crude rubber or to compounded rubber mixtures which may contain natural or artificial rubber or both, before the vulcanization, resinous and asphaltic products of the destructure oxidation of paraffin waxes. The oxidation products may be used without further treatment for example in cases when the oxidation has been carried so far that considerable resinification has occurred, or the resinous and asphaltic masses which are obtained by converting the said oxidation products or fractions thereof, by heating, treatment with oxidizing or sulphurizing agents, distillation or the like, or combinations of such processes may be employed. For the sake of brevity the said products obtained by a treatment of the oxidation products will be referred to in the following and in the claims as converted oxidation products of high molecular organic compounds. The distillation residues obtainable by distilling the portion insoluble in petroleum ether, of an oxidation product prepared by treating paraffin waxes with a gaseous oxidizing agent while heating, are advantageously adapted for employment for this purpose, and especially when the distillation is not carried very far so that the distillation residues contain a large quantity of hydroxy carboxylic acids.

In accordance with the present invention very valuable vulcanized products are obtained, which have for example as regards the breaking load and the breaking tension a much higher value than rubber vulcanized without the additions described or rubber vulcanized after the addition of mineral rubber (a bitumen). The aforesaid good results are obtained by additions of the resinous and asphaltic oxidation products arising to about from 5 to 15 per cent by weight of the rubber present, but also lower or higher quantities may be employed, depending on the desired properties of the vulcanizate. In any case the breaking load is higher than that of a vulcanizate prepared with the aid of an equal quantity of mineral rubber. The properties, for example the consistency, of the additional substances hereinbefore described may be also altered very considerably and thereby they may be adapted for different purposes, by a special pretreatment for example by heating with oxidizing gases or sulphur, zinc oxide and the like before their application. The resinous and asphaltic products, which are preferably mixed with the rubber before the other substances usually employed in the manufacture of rubber articles from India rubber, such as vulcanizing agents, vulcanization accelerators are rolled into the same, increase the plasticity and fillers, preservatives against ageing, coloring materials and so on, facilitate to a marked degree the homogenization of the vulcanization mixture. This fact is of great importance for certain artificial rubbers.

The following example will further illustrate the nature of the invention but the invention is not restricted thereto. The parts are by weight.

Example 100 parts of a distillation residue obtained on distilling the acid portion, insoluble in petroleum ether, of an oxidation product of paraffin wax, are heated while stirring with 3 parts of sulphur in an open vessel immersed in a metal bath at 300° centigrade until the initially vigorous evolution of sulphuretted hydrogen has almost ceased. A plastic mass is obtained after cooling.

A mixture of 5 parts of this product, 100 parts of natural rubber (smoked sheets), 0.6 part of mercaptobenzothiazol (vulcanization accelerator), 5 parts of zinc oxide, 40 parts of lampblack, 4 parts of stearic acid, 1 part of a condensation product of aldol and $\alpha$-naphthylamine and 3 parts of sulphur is rolled in the usual manner and vulcanized for 30 minutes at 141° centigrade. A vulcanized product is obtained, the breaking load and tension of which is much higher than could be obtained without the aforesaid addition or with mineral rubber.

Instead of the product described in the first paragraph of this example the untreated distillation residue, which is therefore free from sulphur, may be employed.

What we claim is:—

1. As new compositions of matter vulcanizable compounded rubber mixtures comprising rubber and a resinous and asphaltic product of the destructive oxidation of paraffin waxes.

2. As new compositions of matter vulcanizable compounded rubber mixtures comprising rubber and a resinous and asphaltic converted product of the destructive oxidation of paraffin waxes.

3. As new compositions of matter vulcanizable compounded rubber mixtures comprising rubber and about from 5 to 15 per cent its weight of a resinous and asphaltic product of the destructive oxidation of paraffin waxes.

4. As new compositions of matter vulcanizable compounded rubber mixtures comprising rubber and about from 5 to 15 per cent its weight of a resinous and asphaltic converted product of the destructive oxidation of paraffin waxes.

5. As new compositions of matter vulcanizable compounded rubber mixtures comprising rubber and a resinous and asphaltic product having a residue in the distillation of the acid portion insoluble in petroleum ether of the destructive oxidation of paraffin wax.

6. As new compositions of matter vulcanizable compounded rubber mixtures comprising rubber and from 5 to 15 per cent its weight of a resinous and asphaltic product being a residue in the distillation of the acid portion insoluble in petroleum ether of the destructive oxidation of paraffin wax.

7. As new compositions of matter vulcanizable compounded rubber mixtures comprising rubber, from 5 to 15 per cent its weight of a sulphuretted resinous and asphaltic distillation residue from the distillation of the acid portion, insoluble in petroleum ether, of the destructive oxidation of paraffin wax.

In testimony whereof we have hereunto set our hands.

HANS KLEIN.
ARTHUR BECK.